(12) United States Patent
Desmond et al.

(10) Patent No.: US 11,525,719 B2
(45) Date of Patent: Dec. 13, 2022

(54) ESTIMATING FLOW VELOCITY BY HARMONIC EXCITATION OF INJECTED MICROBUBBLES

(71) Applicant: ExxonMobil Research and Engineering Company, Annandale, NJ (US)

(72) Inventors: Kenneth W. Desmond, Nazareth, PA (US); Gary L. Hunter, Stewartsville, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 391 days.

(21) Appl. No.: 16/190,653

(22) Filed: Nov. 14, 2018

(65) Prior Publication Data

US 2019/0154482 A1    May 23, 2019

Related U.S. Application Data

(60) Provisional application No. 62/587,587, filed on Nov. 17, 2017.

(51) Int. Cl.
*G01F 1/663* (2022.01)
*G01F 1/74* (2006.01)
(Continued)

(52) U.S. Cl.
CPC .............. *G01F 1/663* (2013.01); *G01F 1/667* (2013.01); *G01F 1/7082* (2013.01); *G01F 1/74* (2013.01); *G01F 1/712* (2013.01)

(58) Field of Classification Search
CPC ..................................................... G01F 1/7082
See application file for complete search history.

(56) References Cited

U.S. PATENT DOCUMENTS 4,545,244 A    10/1985  Yasuda et al.
4,787,252 A *  11/1988  Jacobson ................ G01F 1/712
                                                    73/861.28
(Continued)

FOREIGN PATENT DOCUMENTS

CN    204575298 U  *  8/2015
EP      0938686 A1     9/1999
(Continued)

OTHER PUBLICATIONS

Machine translation of Fujiwara (Year: 2013).*
The International Search Report and Written Opinion of PCT/US2018/060989 dated Mar. 4, 2019.

*Primary Examiner* — Matthew G Marini
(74) *Attorney, Agent, or Firm* — Vorys, Sater, Seymour and Pease LLP (57) ABSTRACT

Systems and methods are provided for estimating the flow velocity of a multi-phase flow in a pipe using injected microbubbles in combination with ultrasonic signals produced by transducers external to the pipe. The transducers can be located so that one transducer/receiver pair is downstream from a second pair by a separation distance. The receivers can preferably be located in alignment with the transducers for receiving a desirable amount of signal emitted from microbubbles that are excited by absorption of energy from a signal generated by a transducer. The frequency of the signal emitted by the microbubbles can correspond to a harmonic and/or sub-harmonic of the frequency of the signal generated by the transducer. In order to improve the signal-to-noise ratio, frequencies corresponding to a primary frequency emitted by a transducer can be filtered out.

20 Claims, 4 Drawing Sheets

(51) Int. Cl.
    *G01F 1/7082*     (2022.01)
    *G01F 1/667*     (2022.01)
    *G01F 1/712*     (2006.01)

(56) References Cited

U.S. PATENT DOCUMENTS

| | | | |
|---|---|---|---|
| 6,266,620 | B1 | 7/2001 | Baeten et al. |
| 6,408,699 | B1 * | 6/2002 | Moss .................. G01F 1/663 |
| | | | 73/861.25 |
| 2003/0216644 | A1 | 11/2003 | Hall |
| 2008/0163700 | A1 * | 7/2008 | Huang .................. G01F 1/663 |
| | | | 73/861.25 |
| 2009/0131791 | A1 | 5/2009 | Clark |
| 2012/0055239 | A1 | 3/2012 | Sinha |
| 2013/0238260 | A1 | 9/2013 | Fukuhara et al. |
| 2014/0012518 | A1 * | 1/2014 | Ramamurthy ............ G01F 1/66 |
| | | | 702/48 |
| 2014/0096599 | A1 | 4/2014 | Munch et al. |
| 2015/0122049 | A1 * | 5/2015 | Berkcan ................ G01K 13/02 |
| | | | 73/861 |

FOREIGN PATENT DOCUMENTS

| | | | | |
|---|---|---|---|---|
| JP | 2010223839 | A | * | 10/2010 |
| JP | 2013107043 | A | * | 6/2013 |
| WO | 2013/104726 | A1 | | 7/2013 |
| WO | WO-2013109191 | A1 | * | 7/2013 ............ G01F 1/708 |
| WO | WO-2014165833 | A2 | * | 10/2014 ........... E21B 49/087 |

\* cited by examiner

ESTIMATING FLOW VELOCITY BY HARMONIC EXCITATION OF INJECTED MICROBUBBLES

CROSS-REFERENCE TO RELATED APPLICATIONS

This application claims priority to U.S. Provisional Application Ser. No. 62/587,587 filed Nov. 17, 2017, which is herein incorporated by reference in its entirety.

FIELD

Systems and methods are provided for estimating the velocity of a multi-phase flow in a pipe or conduit based on correlation of ultrasonic signal intensities, where the signal intensities are generated by harmonic excitation of injected microbubbles.

BACKGROUND

Petroleum extraction methods generally include transport of a multi-phase flow through one or more pipes as oil is transported up to the surface and then passed to an initial storage and/or processing location at the extraction site. In addition to the desired hydrocarbons potentially including both gas phase and liquid phase portions, the multi-phase flow can also include entrained solids, other types of gas phase bubbles, and possibly multiple liquid phase regions due to the presence of non-hydrocarbon liquids (such as water) and/or incomplete mixing of hydrocarbons of different types/boiling ranges. During oil extraction, it can be desirable to characterize the flow rate within the pipes or other conduits used for transporting the extracted hydrocarbons. This can include characterizing the overall flow rate generated by one or more oil wells (or other extraction sites) and/or characterizing the flow rate in different zones within a single extraction site.

Conventionally, characterization of the flow rate is performed by periodically (e.g. every couple of months) diverting flow from a co-mingled collection of wells to a settling tank to determine the phase fractions and production rates. In addition to providing information about only the final co-mingled product, the time scale of waiting multiple weeks or months between characterization events can present difficulties when attempting to optimize production from a given well and/or a given zone within an extraction site.

As an alternative to diverting flows into a storage tank, conventional flow meters can be employed that are calibrated for expected operating conditions (e.g. temperature, flow composition, and flow morphology). Despite the calibrations, these flow meters are often inaccurate when compared to direct measurements. Additionally, deployment of many commercially available meters requires a section of pipe be removed and replaced with a specially designed pipe, making use of such flow meters in existing pipelines prohibitive from a cost standpoint.

Still other alternatives for determining a flow velocity can be based on methods that involve substantial training for the operator and/or specialized equipment that is typically more suited for laboratory use. For example, nuclear magnetic resonance (NMR) imaging or gamma ray imaging can be used to determine a flow rate within a pipe or conduit. However, both of these techniques require substantial operator expertise to perform the measurement and analyze the data. Additionally, the equipment required for these measurements can be difficult to adapt to the environment at an extraction site.

What is needed are methods for determining the flow rate of a multi-phase flow within a pipe, and corresponding systems to facilitate such methods. The methods can preferably be performed and/or the systems can preferably be installed and used without requiring replacement of a section of the pipe to allow for insertion of a sensor. Additionally, the methods can preferably be performed and/or the systems can preferably be used without requiring substantial training of an operator. Further, the systems and methods can preferably allow for characterization of the flow velocity of a multi-phase flow in spite of the potentially unpredictable composition and/or characteristics of the multi-phase flow.

U.S. Patent Application Publication 2013/0238260 describes an ultrasonic flow meter that measures a flow volume of a primarily single phase fluid by sending an ultrasonic signal to the fluid and receiving a transmission signal or a reflection signal obtained from the fluid. The received transmission signal can be used to determine a first flow volume while the reflection signal can be used to determine a second flow volume. The first flow volume or second flow volume can then be selected for output to the user based on a volume of air bubbles in the fluid, as determined by a correcting unit.

U.S. Patent Application Publication 2014/0096599 describes a method and apparatus for determining a flow rate of a fluid and detecting gas bubbles or particles in the fluid. The gas bubbles or particles are detected based on a collapse of an amplitude of an ultrasonic signal. The flow rate can be determined based on a travel time of the ultrasonic signal in the fluid. A plurality of transmitters and receivers can be used to allow for averaging of a plurality of determined flow rates in order to reduce errors in the flow rate determination.

U.S. Pat. No. 4,545,244 describes a method and apparatus for using a pair of transducers to determine a flow rate in a fluid. In some aspects, the transducers can be configured so that one is upstream relative to the other to allow for a measurement of flow rate based on both a Doppler shift and a time of propagation for an ultrasonic wave.

SUMMARY

In various aspects, a method for estimating a flow velocity of a multi-phase flow in a pipe is provided. The method can include injecting bubbles having a diameter of 50 µm or less into a multi-phase flow through a pipe. An example of a multi-phase flow is a flow that includes a liquid phase and at least one of gas bubbles, solid particles, and an immiscible second liquid phase. The method can further include generating, by a first transducer, a first ultrasonic signal having a frequency $f_1$ suitable for excitation of at least a portion of the injected bubbles. The first transducer can be located on an exterior of the pipe. A first receiver, also located on the exterior of the pipe, can receive a portion of emitted signal from the excited injected bubbles, where the emitted signal has a frequency $C_1 f_1$ where $C_1$ does not equal 1. This first received signal can be passed through a first filter to form a first filtered signal, the first filter being configured for exclusion of at least a signal having a frequency $f_1$ from the first filtered signal and configured for inclusion of at least a signal having a frequency $C_1 f_1$ in the first filtered signal. Examples of suitable filters can include band-pass filters, notch filters, and lock-in filters. The method can further include generating, by a second transducer, a second ultrasonic signal having a frequency $f_2$ suitable for excitation of at least a portion of the injected bubbles, the first transducer also being located on an exterior of the pipe. The first transducer and the second transducer can be separated by a separation distance. A second receiver, also mounted on the exterior of the pipe, can receive a portion of emitted signal from the excited injected bubbles having a frequency $C_2 f_2$ where $C_2$ does not equal 1. This second received signal can be passed through a second filter to form a second filtered signal. The second filter can be configured for exclusion of at least a signal having a frequency $f_2$ from the second filtered signal and configured for inclusion of at least a signal having a frequency $C_2 f_2$ in the second filtered signal. The first filtered signal can be cross-correlated with the second filtered signal to determine a time shift corresponding to a maximum correlation between the first filtered signal and the second filtered signal. Based on the separation distance and the determined time shift, a flow velocity of the multi-phase flow can be estimated.

In various aspects, a system for estimating a flow velocity of a multi-phase flow in a pipe is also provided. The system can include a microbubble generator mounted to a port in a pipe. The microbubble generator can be mounted, for example, upstream from a first transducer and a second transducer. The system can further include a first transducer mounted on an exterior of the pipe. The first transducer can be configured to generate a first ultrasonic signal having a frequency $f_1$ suitable for excitation of at least a portion of the injected bubbles. The system can further include a first receiver mounted on the exterior of the pipe. The system can further include a second transducer mounted on the exterior of the pipe at a separation distance from the first transducer. The second transducer can be configured to generate a second ultrasonic signal having a frequency $f_2$ suitable for excitation of at least a portion of the injected bubbles. The system can further include a second receiver mounted on the exterior of the pipe. The system can further include a first filter in signal communication with the first receiver to form a first filtered signal. The first filter can be configured for exclusion of at least signals having a frequency of $f_1$ from the first filtered signal and configured for inclusion of at least a signal having a frequency $C_1 f_1$ in the first filtered signal. The system can further include a second filter in signal communication with the second receiver to form a second filtered signal. The second filter can be configured for exclusion of at least signals having a frequency $f_2$ from the second filtered signal and configured for inclusion of at least a signal having a frequency $C_2 f_2$ in the second filtered signal. The system can further include a correlator for determining a time shift based on cross-correlation of the first filtered signal and the second filtered signal.

In some aspects, the second receiver can have substantially the same alignment relative to the second transducer as the alignment of the first receiver relative to the first transducer.

In some aspects, the first filter and/or the second filter can correspond to comprises at least one of a band-pass filter, a notch filter, and a lock-in filter. Optionally, the first filter can be further configured for exclusion of signals having a frequency $f_2$ and/or $C_2 f_2$ from the first filtered signal. Optionally, the second filter can be further configured for exclusion of signals having a frequency $f_1$ and/or $C_1 f_1$ from the second filtered signal.

In various aspects, $C_1 f_1$ can correspond to a harmonic frequency of $f_1$ and/or a sub-harmonic frequency of $f_1$, such as a plurality of harmonic frequencies, a plurality of sub-harmonic frequencies, or a combination thereof. In various aspects, $C_2 f_2$ can correspond to a harmonic frequency of $f_2$ and/or a sub-harmonic frequency of $f_2$, such as a plurality of harmonic frequencies, a plurality of sub-harmonic frequencies, or a combination thereof In some aspects, $f_1$ and/or $f_2$ can correspond to a frequency between 20 kHz and 100 MHz, or 100 kHz to 10 MHz. In some aspects, a magnitude of $f_1 - f_2$ can be 0.01% to 50% of a magnitude of $f_1$. In other aspects, $f_1$ can be the same as $f_2$.

In some aspects, cross-correlation of the first filtered signal and the second filtered signal can include dividing the first filtered signal into a first plurality of time windows and dividing the second filtered signal into a second plurality of time windows. One or more time windows from the first plurality of time windows can then be cross-correlated with one or more corresponding time windows from the second plurality of time windows to generate a series of estimated flow velocities. Optionally, at least one time window from the first plurality of time windows overlaps in time with at least a second time window from the first plurality of time windows. Optionally, the dividing locations in the second plurality of time windows can be offset from dividing locations in the first plurality of time windows.

DETAILED DESCRIPTION

All numerical values within the detailed description and the claims herein are modified by "about" or "approximately" the indicated value, and take into account experimental error and variations that would be expected by a person having ordinary skill in the art.

Overview

In various aspects, systems and methods are provided for estimating the flow velocity of a multi-phase flow in a pipe using injected microbubbles in combination with ultrasonic signals produced by transducers external to the pipe. The transducers can be located so that one transducer/receiver pair is downstream from a second pair by a separation distance. The receivers can preferably be located in alignment with the transducers for receiving a desirable amount of signal emitted from microbubbles that are excited by absorption of energy from a signal generated by a transducer. The frequency of the signal emitted by the microbubbles can correspond to a harmonic and/or sub-harmonic of the frequency of the signal generated by the transducer. In order to improve the signal-to-noise ratio, any signal directly transmitted from a transducer can be filtered out using a filter, such as a band-pass filter, a notch filter, or a lock-in filter (i.e., a filter including a lock-in amplifier).

Optionally, the transducers can be configured to generate ultrasonic signals of different frequencies. This can allow the different transducers to cause different harmonic excitations of the microbubbles with corresponding different frequencies of emission. As noted above, filters are used on the received signals, so that the resulting filtered signals from the receivers can correspond substantially to signals emitted by the harmonically excited bubbles. The filtered signals can then be cross-correlated to determine a time shift that results in a maximum correlation. This time shift can be used in conjunction with the distance between the transducers to calculate an estimated flow velocity.

Attempting to measure and/or estimate the flow velocity of a multi-phase flow using a simple, non-intrusive method can pose a variety of challenges. For example, the unpredictable nature of the multi-phase flow can present difficulties in attempting to interpret the time-varying response of signals. One option for overcoming the difficulties due to inconsistent time-varying response in a multi-phase flow can be to use a cross-correlation technique. In a cross-correlation measurement, two pairs of transducers and receivers can be used, with one transducer/receiver pair located upstream from the second transducer/receiver pair. Instead of attempting to interpret a time-varying response of the flow, the changes in transmission as the signal passes through at least a portion of the multi-phase flow can be monitored. These changes in ultrasonic transmission can then be monitored under the assumption that, if the distance between the transducers is small enough, the multi-phase flow may not change substantially between the locations of the transducers. Under the assumptions that a similar composition and structure of the multi-phase flow will produce a similar response, and that the structure of the multi-phase flow (such as the position of various particles/phases within the flow) does not change significantly between the locations of the transducers, the signals from the two transducer/receiver pairs can be cross-correlated to determine the length of time required for a cross-section of the flow in the pipe to travel from the plane of the first transducer/receiver pair to the plane of the second transducer/receiver pair.

Although cross-correlation of signals is known, difficulties remain in attempting to use cross-correlation for determining velocity in multi-phase flows. Some difficulties are related to the movement of contrast agents inherent to the flow, such as large gas bubbles, liquid droplets, or solid particulates. For example, it is typical for large contrast agents in horizontal flows to move at velocities slower than the flow velocity of the continuous fluid phase, and in vertical flow the movement of large gas bubbles can be much large than the flow velocity of the continuous phase. The difference in velocity between the contrast agents and continuous phase depends on many factors that are not typically known in practical settings. This can make it difficult to apply corrections to the estimated flow velocity to account for differences in velocity between a multi-phase flow and the contrast agents. As a result, when using conventional methods for applying a cross correlation technique to estimate flow velocity based on signals that have interacted with large contrast agents, the flow velocity may be over or under-estimated.

In order to overcome at least a portion of the above difficulties with using cross-correlation to characterize the velocity of a multi-phase flow, the cross-correlation technique can be used in conjunction with harmonic excitation of injected microbubbles. The microbubbles can be of a sufficiently small size to roughly match the flow velocity of the continuous phase. For example, in some aspects the injected microbubbles can be less than 25 microns in diameter. Therefore, cross correlations of signals produced by the microbubbles can result in an improved estimate of the flow velocity relative to a cross-correlation of signals based on the larger contrast agents typically present in a multi-phase flow.

In order to generate a signal that reflects interaction with the microbubbles while having a reduced or minimized amount of interaction with other contrast agents, harmonic excitation of microbubbles can be applied. Harmonic excitation works by emitting a signal from a source transducer at an emitted frequency. This frequency can be referred to as the primary frequency. If the primary frequency is chosen appropriately, when a microbubble is radiated with the source energy, the microbubble can scatter and/or reemit signals at the primary frequency and at one or more other frequencies that can be referred to as harmonic frequencies (corresponding to higher frequencies) or sub-harmonic frequencies (corresponding to lower frequencies). The reemitted harmonic and/or sub-harmonic signals from the microbubbles can then be detected by the receivers using a filter that removes the primary frequency from the signal. This can result in a received signal that contains the harmonic and/or sub-harmonic signals without containing the primary frequency signal. Examples of suitable filters include a notch filter, a band-pass filter, or a lock-in filter. The production of harmonic and/or sub-harmonic signals is sensitive to many factors with droplet size being one of the substantial factors. Due to the substantial dependence on droplet size, large contrast agents inherent to flow will typically not produce harmonic and/or sub-harmonic signals at a comparable efficiency to the microbubbles. As a result, the cross correlation of the harmonic and sub-harmonic signals can have increased sensitivity to the motion of the microbubbles which more closely match the continuous phase velocity.

In this discussion, the term "pipe" is used to refer to any convenient type of conduit between the locations of the transducer/receiver pairs. The wall of the pipe can be made of any convenient material that allows for sufficient transmission of ultrasonic energy.

Transducer and Receiver Configuration

In various aspects, the orientation of a transducer/receiver pair relative to the axis of fluid flow can be any convenient orientation that allows for interaction of the emitted radiation with contrast agents in the multi-phase flow. In other words, at least a portion of the signal received by the second receiver has interacted with the multi-phase flow at a location downstream from at least a portion of the signal received by the first receiver. Additionally, a second transducer/receiver pair can be located and oriented relative to a first transducer/receiver pair so that the second transducer/receiver pair is downstream from the first transducer/receiver pair. In some preferred aspects, the orientation of the first receiver relative to the first transducer can be the same as the orientation of second receiver relative to the second transducer.

In some aspects, a first transducer and a second transducer can emit signals at different ultrasonic frequencies, resulting in corresponding differences in the harmonic or sub-harmonic emissions from microbubbles excited by each transducer. In such aspects, band-pass filters, notch filters, and/or other suitable signal filters can allow the receivers to receive ultrasonic signals based on emissions from microbubbles excited by the transducer associated with the receiver while reducing, minimizing, or eliminating signal based on the transducer not associated with the receiver.

In other aspects, the first transducer and the second transducer can emit signals at the same frequency and/or substantially the same frequency. In still other aspects, the first transducer and the second transducer can emit signals at different frequencies, but the resulting harmonic and/or sub-harmonic frequencies generated by interaction of the first frequency with the microbubbles can be similar to and/or have overlap with the harmonic and/or sub-harmonic frequencies generated by interaction of the second frequency with the microbubbles. In such aspects, the filters associated with each receiver can be suitable for excluding signals at the primary frequency.

Based on the arrangement of the transducers and receivers, the received signals can be cross-correlated to determine a time shift that produces a maximum correlation. The flow velocity in the pipe can then be estimated as the distance between the transducers divided by the time shift.

During a measurement of the flow velocity, microbubbles can be injected into a multi-phase flow in a pipe. Typical conduits for transporting petroleum flows (and/or other multi-phase flows) can often include ports that allow for injection of fluid, or optionally such ports may be feasible to add to an existing pipe. Production of microbubbles of a given size is relatively well-known, and such microbubbles can be injected into a pipe via any convenient type of port in the pipe. The amount of microbubbles needed for emission of a detectable signal can vary depending on the relationship of the transducer frequency to the resonant frequency of the microbubbles. In various aspects, the size of the microbubbles can be selected so that the microbubbles have an appropriate buoyancy in the multi-phase flow, while being small enough to remain entrained in the flow. Preferably, the microbubbles can be sufficiently large so that the microbubbles stay entrained within the flow, as opposed to moving to the top of the flow (i.e., opposite from the direction of gravitational force) due to buoyancy. With regard to selecting a microbubble size, it can be desirable for the microbubbles to have a terminal velocity/terminal buoyancy that corresponds to less than 1% of the velocity of the flow velocity of the multi-phase flow.

Additionally or alternately, the size of the microbubbles can be related to the desired emission frequencies after excitation of the microbubbles. Suitable diameters can range from roughly 100 nm to 50 μm, or 100 nm to 25 μm, or 2.5 μm to 5.0 μm. A bubble size of ~2.5 μm can correspond to a resonant frequency of roughly 1 MHz, meaning that ultrasonic signals with frequencies in the vicinity of 1 MHz can be suitable for exciting 2.5 μm bubbles to produce sufficient emitted signal intensity for detection. Bubble sizes larger than 50 μm, or larger than 25 μm, tend not to produce harmonic emissions in the desired frequency range. Smaller bubble sizes can potentially be suitable, so long as waves at these higher frequencies can propagate across the pipe without attenuating.

During a measurement of flow velocity of a multi-phase flow that includes injected microbubbles, a first transducer can generate a signal at a first frequency $f_1$. The generated signal can excite at least a portion of the injected microbubbles. This can cause the harmonically excited microbubbles to emit an ultrasonic signal at a harmonic or sub-harmonic frequency relative to the excitation frequency. This harmonic or sub-harmonic frequency can be related to the frequency $f_1$ generated by the first transducer as $C_1 f_1$, where $C_1$ is a constant that does not equal 1. A first receiver can receive a portion of the emitted signal from the harmonically excited microbubbles.

A first receiver can be aligned to receive a portion of the harmonic and/or sub-harmonic frequencies generated by the interaction of the emitted signal with the microbubbles. It is not required that the first transducer and first receiver are diametrically opposed. Instead, a wide variety of alignments for the first transducer and the first receiver can be suitable, so long as the alignment of the first transducer and the first receiver allows the first receiver to receive a portion of the signal from the first transducer that has interacted with contrast agents in the multi-phase flow. In some aspects, the first receiver can be located within the arc or cone of transmission for the first transducer. In other aspects, the first receiver can be located in a position that is convenient for receiving a scattered signal from the first transducer, such as a back-scattered signal.

During such a measurement of flow velocity of a multi-phase flow that includes injected microbubbles, a second transducer and second receiver can be located downstream by a distance. In some preferred aspects, the orientation of the second receiver relative to the second transducer can be substantially the same as the orientation of the first receiver relative to the first transducer. In other words, the location of the second receiver on the pipe relative to the second transducer can be similar to the location relationship of the first receiver and the first transducer. The second transducer can generate a signal at a second frequency $f_2$. The second frequency $f_2$ can be the same as or different from the first frequency $f_1$. The generated signal at the second frequency can excite at least a portion of the injected microbubbles. This can cause the harmonically excited microbubbles to emit an ultrasonic signal at a harmonic or sub-harmonic frequency relative to the second excitation frequency. This harmonic or sub-harmonic frequency can be related to the frequency $f_2$ generated by the first transducer as $C_2 f_2$, where $C_2$ is a constant that does not equal 1. It is noted that $C_2$ may be the same as $C_1$ or different from $C_1$.

The second receiver can receive a portion of the emitted signal from the harmonically excited microbubbles. Similar to the first transducer and first receiver, a wide variety of alignments can be suitable for the second transducer and second receiver. In some aspects, the orientation of the second receiver relative to the second transducer can be substantially the same as the orientation of the first receiver relative to the first transducer. In other words, the location of the second receiver on the pipe relative to the second transducer can be similar to the location relationship of the first receiver and the first transducer. In other aspects, the orientation of the second receiver relative to the second transducer can be any convenient orientation relative to the first transducer/receiver pair. As long as the relative orientations of the first transducer/receiver pair and the second transducer/receiver pair are known, any differences in the orientation can be accounted for when determining the time shift for cross-correlation.

The received signal from both the first receiver and the second receiver can then be passed through filters, such as band-pass filters, notch filters, lock-in filters, and/or any other convenient type of signal filter that can allow for exclusion of signal corresponding to the primary frequency while retaining the harmonic portion of the received signal and/or the sub-harmonic portion of the received signal. In some aspects where $f_1$ and $f_2$ are the same or substantially similar, or where the desired harmonics and/or sub-harmonics from excitation are similar or overlap, the goal of filtering can be to exclude the signals corresponding to the primary frequencies $f_1$ and $f_2$.

In some aspects where $f_1$ and $f_2$ are different, it may be possible to use filtering to retain a harmonic or sub-harmonic signal at one or more frequencies $C_1 f_1$ while filtering out or excluding both $f_2$ and $C_2 f_2$. Similarly, in such aspects it may be possible to use filtering to retain a harmonic or sub-harmonic signal at one or more frequencies $C_2f_2$ while filtering out or excluding both $f_1$ and $C_1f_1$.

In some aspects, the harmonic and/or sub-harmonic signals received by a receiver may correspond to signals generated by microbubbles in only a portion of a multi-phase flow. For example, due to signal attenuation, the depth of penetration of the primary frequency of a transducer may be limited, so that detectable harmonic and/or sub-harmonic frequencies are generated only by bubbles within a certain distance of a transducer. In such aspects, it could be beneficial to use more than one transducer/receiver pair at a given location along a pipe, in order to estimate the flow velocity of different portions of a multi-phase flow. In other words, multiple first transducers and first receivers can be used, with corresponding multiple second transducers and second receivers to allow for characterization of different portions of a single multi-phase flow. Optionally, it can be beneficial for each transducer in such a configuration to operate at a different frequency.

In various aspects, the frequencies emitted by the transducers can correspond to ultrasonic frequencies. In this discussion, ultrasonic frequencies correspond to frequencies from 20 kHz to 100 MHz. In some aspects, the ultrasonic frequencies can be between 100 kHz and 10 MHz. Preferably, both f+δ and f−δ can correspond to frequencies within 20 kHz to 100 MHz, or within 100 kHz to 10 MHz. The corresponding wavelength for an ultrasonic signal can vary depending on the nature of the multi-phase flow. The speed of sound in various typical liquids (such as diesel fuel or water) can be roughly 1600 m/s or less. At 1600 m/s, 20 kHz can correspond to a wavelength of 8.0 cm; 100 kHz can correspond to a wavelength of 1.6 cm; 10 MHz can correspond to a wavelength of 0.16 mm or 160 µm; and 100 MHz can correspond to a wavelength of 8.0 µm. However, it is noted that bitumen and/or other heavy petroleum fractions can in some instances have energy transfer properties that are more similar to an amorphous solid than a liquid, resulting in potential speed of sound values up to 2500 m/s or possibly still higher. This type of increase in the speed of sound for a multi-phase flow can potentially roughly double the corresponding wavelength for a given ultrasonic frequency.

In various aspects, the transducers can be located as close together as is practical based on the size of the transducers. The separation distance between two transducers can be defined as the distance between the geometric center of the transducers along an axis parallel to the fluid flow axis of the pipe. Optionally, for aspects where $f_1$ and $f_2$ are different, the separation distance between the transducers can be greater than or equal to the wavelength corresponding to the smaller of $f_1$ and $f_2$.

The frequency of the ultrasonic radiation can be selected so that the corresponding wavelength of the radiation is sufficiently small relative to the size of the pipe. In various aspects, the diameter of the pipe can be at least 1 times greater than the wavelength corresponding to the smaller of $f_1$ and $f_2$, or at least 5 times greater, or at least 10 times greater. Typical pipe diameters for petroleum extraction applications can range from 3.0 cm to 40 cm, or 10 cm to 30 cm. Thus, corresponding suitable maximum wavelengths can be from 0.6 cm to 8.0 cm, or 0.3 cm to 4.0 cm, or 2.0 cm to 6.0 cm, or 1.0 cm to 3.0 cm.

In some aspects, $f_1$ and $f_2$ can be selected to be sufficiently different to allow for filtering of $f_1$ while retaining $f_2$ (and vice versa) using a conventionally available band-pass filter, notch filter, or a filter including lock-in amplifier (referred to herein as a lock-in-filter). In some aspects, the magnitude of the difference between $f_1$ and $f_2$ can be at least 0.1% of the value of $f_1$, or at least 10%, or at least 20%, such as 5% to 50% of the value of $f_1$ (or possibly still more), or 0.1% to 30% of the value of $f_1$. In some aspects, the difference between $f_1$ and $f_2$ can have a smaller magnitude corresponding to at least 0.01% of the value of $f_1$, or at least 0.1%, or at least 1.0%. For example, the magnitude of the difference between $f_1$ and $f_2$ can be 0.01% to 50% of $f_1$, or 1% to 50%, or 0.01% to 25%, or 0.01% to 10%, or 1.0% to 25%, or 1.0% to 10%.

The amplitude of the ultrasonic signals can be any convenient amplitude that allows the receiver to distinguish between ultrasonic signals emitted by the microbubbles and the noise floor. In particular, the distinction between the signals and the noise floor needs to be sufficient to allow for cross-correlation of the received signals to determine a time shift corresponding to a maximum correlation.

After filtering of the received signals, the first filtered signal and the second filtered signal can be cross-correlated to identify a time shift that produces a maximum correlation between the filtered signals. The time shift corresponding to a maximum correlation can represent the length of time required for a portion of the multi-phase flow to move the plane of the first transducer/receiver pair to the plane of the second transducer/receiver pair. The distance between the transducers divided by the time shift can provide an estimate of the flow velocity.

The cross-correlation of the signal from the first receiver and the second receiver can be performed in any convenient manner. Commercial packages are available that can allow for determining a time shift between signals to identify a time shift corresponding to a maximum similarity between the signals.

In some aspects, it may be desirable to develop a profile of flow velocity estimates over time, as opposed to simply calculating a single velocity estimate. Obtaining and handling the data to determine flow velocity estimates as a function of time can be performed in any convenient manner. One option can be to use synchronous pulses of ultrasonic energy from each transducer. Each synchronized pulse can be used to perform a separate cross-correlation to determine a flow velocity estimate. Another option can be to continuously transmit the ultrasonic energy and divide the received data into windows by any convenient method. When dividing data into windows, it may optionally be preferred to offset the data windows for the second receiver by an amount less than the expected time shift during cross-correlation, in order to increase the amount of data available in each data window for cross-correlation. Optionally, such an increase in available data can also be facilitated by allowing the data windows to overlap.

Configuration Examples

Figure 1:
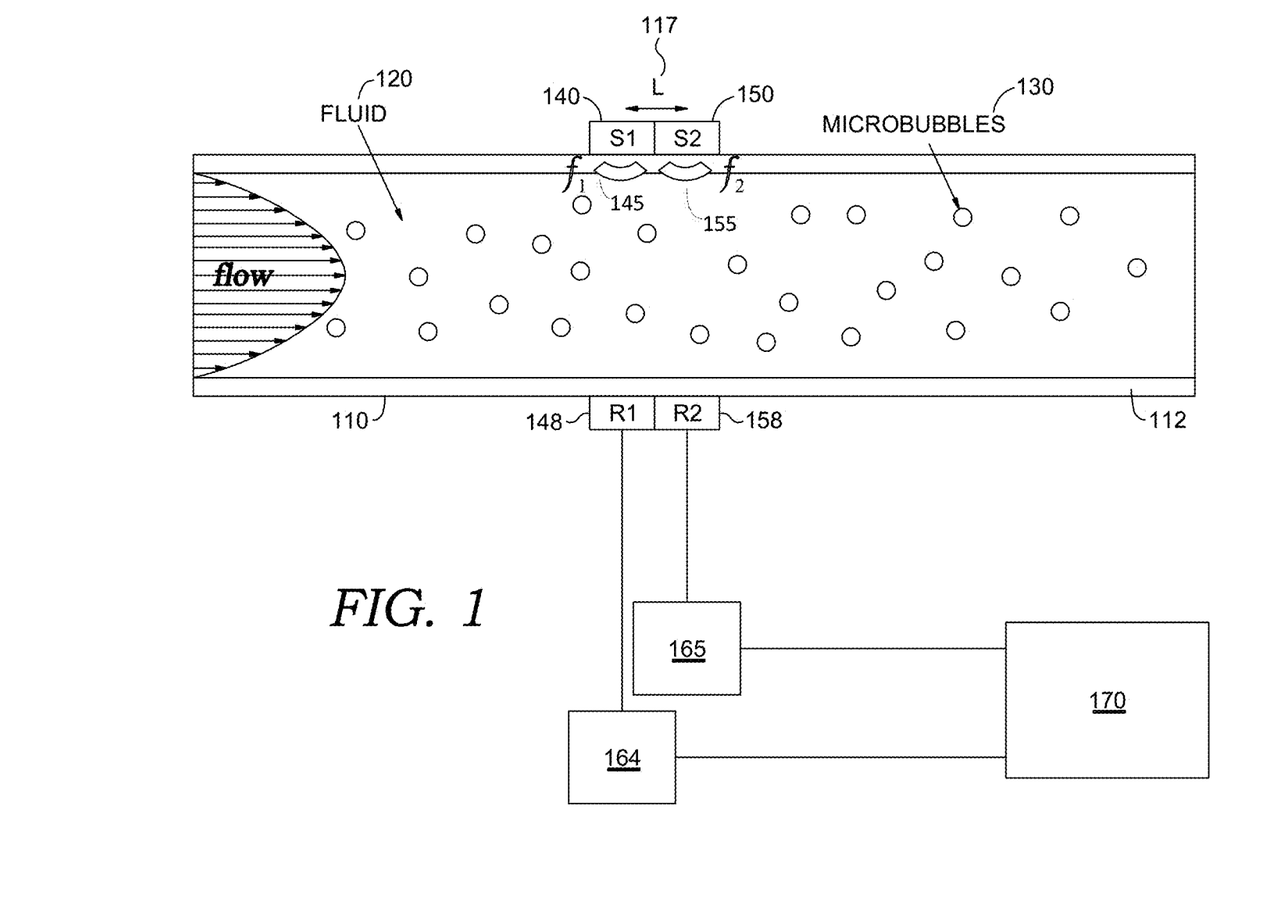
FIG. 1 schematically shows an example of a system for measuring a flow velocity in a pipe using ultrasonic signals generated by transducers external to the pipe.

FIG. 1 shows an example of a configuration for using cross-correlation of ultrasonic signals to estimate a flow velocity in a pipe. In FIG. 1, a pipe 110 contains a multi-phase fluid flow that includes both liquid 120 and microbubbles 130. It is noted that the multi-phase flow includes multiple phases prior to injection of microbubbles 130 into the flow, meaning that the multiphase flow includes liquid 120 and at least one additional phase, such as other gas bubbles different from microbubbles 130, solid particles, and/or other liquid phases that are not fully miscible with liquid 120. The microbubbles 130 are injected upstream from the portion of pipe 110 shown in FIG. 1. Transducers 140 and 150 can be mounted externally on pipe wall 112 of pipe 110. Corresponding receivers 148 and 158 can also be mounted externally on pipe wall 112. The separation between transducer 140 and transducer 150 corresponds to a length 117. The planes defined by transducer 140/receiver 148 and transducer 150/receiver 158 can be substantially perpendicular to the direction of the multi-phase flow in the pipe. Transducer 140 can emit an ultrasonic signal 145 at a frequency $f_1$ that is passed into the multi-phase flow. The ultrasonic signal 145 can excite at least a portion of microbubbles 130. This can cause the excited microbubbles to emit a signal at a harmonic or sub-harmonic frequency $C_1 f_1$ and at least a portion of this emitted signal is received by receiver 148. Similarly, transducer 150 can emit an ultrasonic signal 155 at a frequency $f_2$ that is passed into the multi-phase flow. The ultrasonic signal 155 can excite at least a portion of microbubbles 130. This can cause the excited microbubbles to emit a signal at a harmonic or sub-harmonic frequency $C_2 f_2$, and at least a portion of this emitted signal is received by receiver 158. The signal received at receiver 148 can then be filtered using a filter 164 to produce a filtered signal that includes frequencies near $C_1 f_1$ and excludes frequencies near $f_1$. Optionally, the filtered signal can exclude frequencies near excludes frequencies near $f_1$, $f_2$, and $C_2 f_2$. The signal received at receiver 158 can be filtered using a filter 165 to produce a filtered signal that includes frequencies near $C_2 f_2$ and excludes frequencies near $f_2$. Optionally, the filtered signal can exclude frequencies near $f_2$, $f_1$, and $C_1 f_1$. The filtered signals can then be cross-correlated in a correlator 170 to determine a time shift $\tau$ between the signals that produces a maximum correlation. The velocity of the multi-phase flow in the pipe 110 can then be estimated as $L/\tau$.

Figure 2:
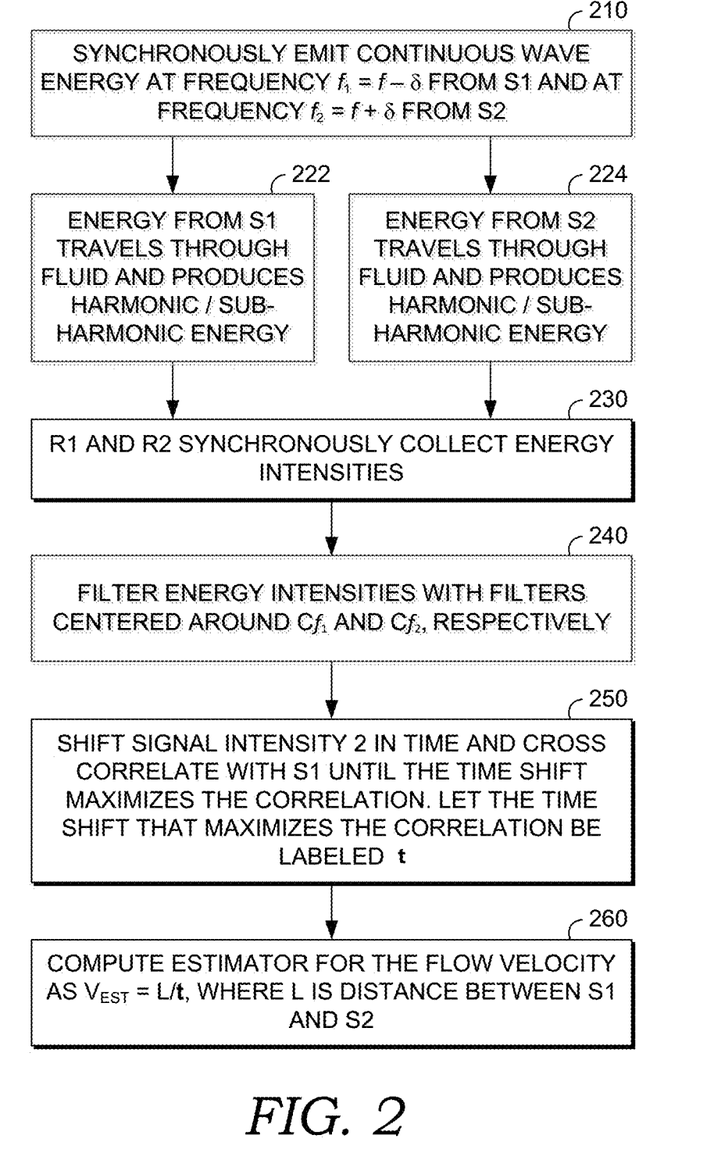
FIG. 2 shows a process flow for measuring a flow velocity in a pipe using ultrasonic signals generated by transducers external to the pipe.

FIG. 2 shows an example of a process flow for determining an estimate of a flow velocity in a pipe. In FIG. 2, a first transducer emits 210 a first signal at frequency $f_1$ while a second transducer emits a signal at frequency $f_2$. The first signal is partially scattered and/or adsorbed 222 on the way to the corresponding receiver. Similarly, the second signal is partially scattered and/or adsorbed 224 on the way to the corresponding receiver. The receivers can then collect 230 the partially scattered and/or adsorbed signals. The collected signals can then be processed 240 using filters to produce filtered signals. The first filtered signal, based on use of a filter centered around $C_1 f_1$, can be referred to as Signal Intensity 1, while the second filtered signal, based on use of a filter centered around $C_2 f_2$, can be referred to as Signal Intensity 2. Signal Intensity 2 can then be shifted in time by an amount $\tau$ to determine a cross-correlation 250 that results in a maximum correlation with Signal Intensity 1. The time amount $\tau$ can then be used to determine an estimated velocity based on the distance L between the transducers and the time $\tau$.

Example of Cross-Correlation of Signals

Figure 3:
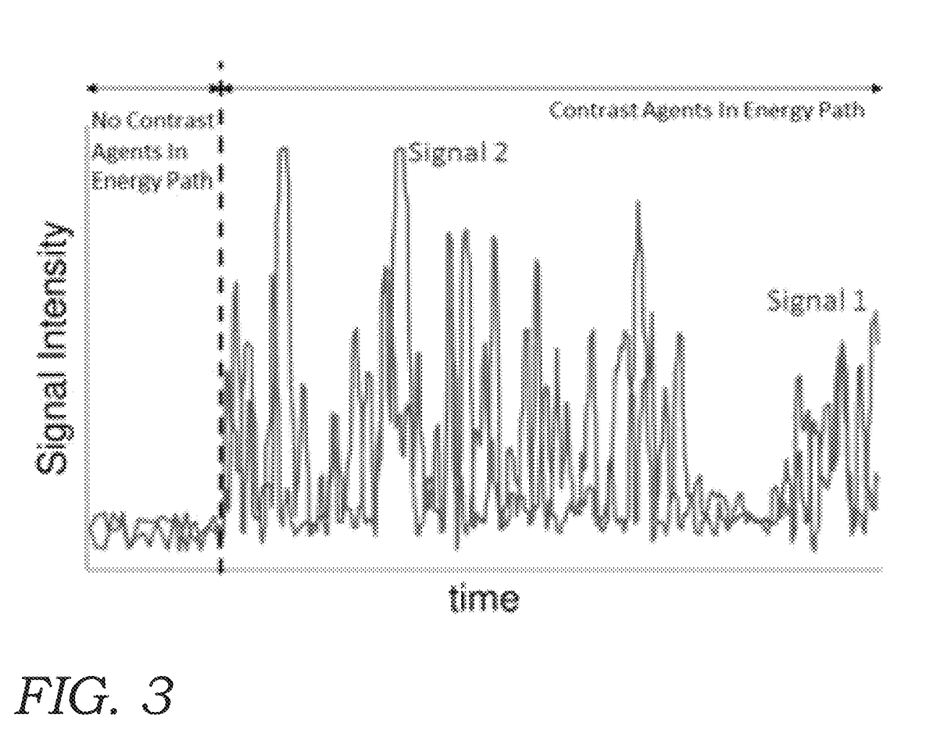
FIG. 3 shows an example of processed signal intensities from ultrasonic signals generated by transducers external to a pipe.

The following is a prophetic example. FIG. 3 shows a hypothetical example of signals received by two receivers that are part of transducer/receiver pairs as described herein. The two signals can be processed to determine a time shift that produces a maximum correlation between the signals. As shown in FIG. 3, little or no signal intensity is received prior to injection of the microbubbles. This is due to a limited amount of interaction between the frequencies emitted by the transducers and the larger contrast agents present in the multi-phase flow. This results in little or no generation of harmonic or sub-harmonic signals. Injection of the microbubbles at the time indicated by the dotted vertical line results in generation of harmonic and/or sub-harmonic signals, as the microbubbles are capable of interacting more strongly with the primary ultrasonic frequencies.

Figure 4:
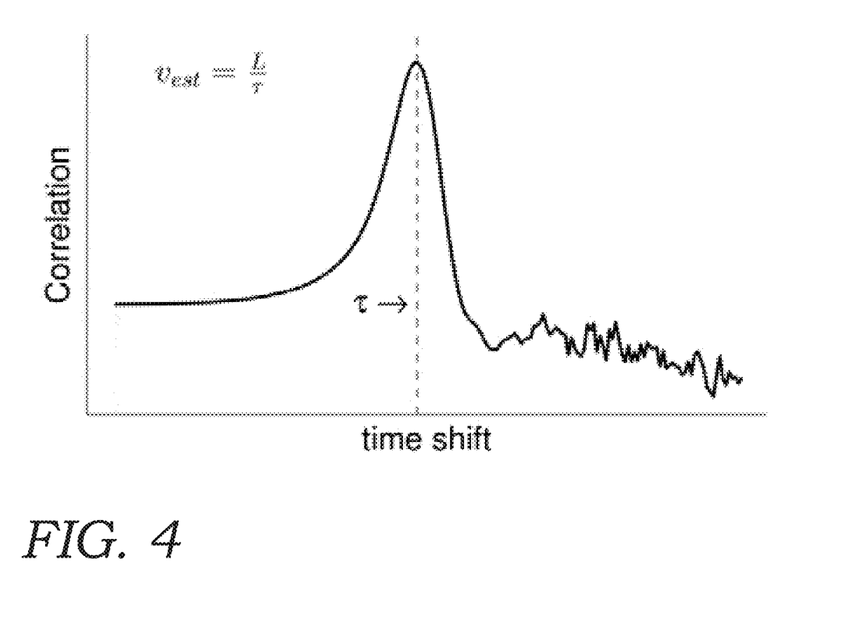
FIG. 4 shows an example of performing cross-correlation on the processed signal intensities shown in FIG. 3.

FIG. 4 shows an example of the correlation between the two signals in FIG. 3 as a function of the time shift $\tau$ for the second signal. As shown in FIG. 4, a distinct maximum in the correlation between the signals can be identified. This maximum corresponds to the time $\tau$, which can then be used to calculate an estimate for the flow velocity in the pipe.

Additional Embodiments

Embodiment 1. A method for estimating a flow velocity of a multi-phase flow in a pipe, comprising: injecting bubbles having a diameter of 50 µm or less (or 25 µm or less) into a multi-phase flow through a pipe; generating, by a first transducer, a first ultrasonic signal having a frequency $f_1$ suitable for excitation of at least a portion of the injected bubbles, the first transducer being located on an exterior of the pipe; receiving, by a first receiver, a first received signal comprising a portion of emitted signal from the excited injected bubbles having a frequency $C_1 f_1$ where $C_1$ does not equal 1, the first receiver being located on the exterior of the pipe; passing the first received signal through a first filter to form a first filtered signal, the first filter being configured for exclusion of at least a signal having a frequency $f_1$ from the first filtered signal and configured for inclusion of at least a signal having a frequency $C_1 f_1$ in the first filtered signal; generating, by a second transducer, a second ultrasonic signal having a frequency $f_2$ suitable for excitation of at least a portion of the injected bubbles, the first transducer being located on an exterior of the pipe, the first transducer and the second transducer being separated by a separation distance; receiving, by a second receiver mounted on the exterior of the pipe, a second received signal comprising a portion of emitted signal from the excited injected bubbles having a frequency $C_2 f_2$ where $C_2$ does not equal 1; passing the second received signal through a second filter to form a second filtered signal, the second filter being configured for exclusion of at least a signal having a frequency $f_2$ from the second filtered signal and configured for inclusion of at least a signal having a frequency $C_2 f_2$ in the second filtered signal; cross-correlating the first filtered signal with the second filtered signal to determine a time shift corresponding to a maximum correlation between the first filtered signal and the second filtered signal; and estimating a flow velocity of the multi-phase flow based on the separation distance and the determined time shift.

Embodiment 2. The method of Embodiment 1, wherein the second receiver has substantially the same alignment relative to the second transducer as the alignment of the first receiver relative to the first transducer.

Embodiment 3. The method of any of the above embodiments, wherein the first filter comprises at least one of a band-pass filter, a notch filter, and a lock-in filter; or wherein the first filter comprises at least one of a band-pass filter, a notch filter, and a lock-in filter; or a combination thereof.

Embodiment 4. The method of any of the above embodiments, wherein the first filter is configured for exclusion of at least signals having a frequency $f_2$, $C_2 f_2$, and $f_1$ from the first filtered signal; or wherein the second filter is configured for exclusion of at least signals having a frequency $f_1$, $C_1 f_1$, and $f_2$ from the second filtered signal; or a combination thereof.

Embodiment 5. The method of any of the above embodiments, wherein $C_1 f_1$ comprises a harmonic frequency of $f_1$ or a sub-harmonic frequency of $f_1$; or wherein $C_2 f_2$ comprises a harmonic frequency of $f_2$ or a sub-harmonic frequency of $f_2$; or a combination thereof.

Embodiment 6. The method of any of the above embodiments, a) wherein the first filtered signal comprises a plurality of harmonic frequencies of $f_1$, a plurality of sub-harmonic frequencies of $f_1$, or a combination thereof; or b) wherein the first filtered signal comprises a plurality of harmonic frequencies of $f_2$, a plurality of sub-harmonic frequencies of $f_2$, or a combination thereof, or a combination of a) and b).

Embodiment 7. The method of any of the above embodiments, wherein $f_1$ comprises a frequency between 20 kHz and 100 MHz (or 100 kHz to 10 MHz), or wherein $f_2$ comprises a frequency between 20 kHz and 100 MHz (or 100 kHz to 10 MHz), or a combination thereof.

Embodiment 8. The method of any of the above embodiments, wherein a magnitude of $f_1f_2$ is 0.01% to 50% of a magnitude of $f_1$, or 0.01% to 25%, or 0.01% to 10%, or 0.1% to 50%, or 0.1% to 10%, or 1.0% to 50%, or 1.0% to 25%; or wherein $f_1$ is the same as $f_2$.

Embodiment 9. The method of any of the above embodiments, wherein cross-correlation of the first filtered signal and the second filtered signal comprises: dividing the first filtered signal into a first plurality of time windows and dividing the second filtered signal into a second plurality of time windows; and cross-correlating one or more time windows from the first plurality of time windows with one or more corresponding time windows from the second plurality of time windows to generate a series of estimated flow velocities.

Embodiment 10. The method of Embodiment 9, wherein at least one time window from the first plurality of time windows overlaps in time with at least a second time window from the first plurality of time windows, or wherein dividing locations in the second plurality of time windows are offset from dividing locations in the first plurality of time windows; or a combination thereof.

Embodiment 11. A system for estimating a flow velocity of a multi-phase flow in a pipe, comprising: a microbubble generator mounted to a port in a pipe; a first transducer mounted on an exterior of the pipe, the first transducer configured to generate a first ultrasonic signal having a frequency $f_1$ suitable for excitation of at least a portion of the injected bubbles; a first receiver mounted on the exterior of the pipe; a second transducer mounted on the exterior of the pipe at a separation distance from the first transducer, the second transducer configured to generate a second ultrasonic signal having a frequency $f_2$ suitable for excitation of at least a portion of the injected bubbles; a second receiver mounted on the exterior of the pipe; a first filter in signal communication with the first receiver to form a first filtered signal, the first filter being configured for exclusion of at least signals having a frequency of $f_1$ from the first filtered signal and configured for inclusion of at least a signal having a frequency $C_1f_1$ in the first filtered signal; a second filter in signal communication with the second receiver to form a second filtered signal, the second filter being configured for exclusion of at least signals having a frequency $f_2$ from the second filtered signal and configured for inclusion of at least a signal having a frequency $C_2f_2$ in the second filtered signal; and a correlator for determining a time shift based on cross-correlation of the first filtered signal and the second filtered signal, wherein the microbubble generator is mounted upstream from the first transducer and the second transducer relative to a direction of flow of the multi-phase fluid.

Embodiment 12. The system of Embodiment 11, wherein the first filter comprises at least one of a band-pass filter, a notch filter, and a lock-in filter; or wherein the first filter comprises at least one of a band-pass filter, a notch filter, and a lock-in filter; or a combination thereof.

Embodiment 13. The system of Embodiment 11 or 12, wherein the first filter is configured for exclusion of at least signals having a frequency $f_2$, $C_2f_2$, and $f_1$ from the first filtered signal; or wherein the second filter is configured for exclusion of at least signals having a frequency $f_1$, $C_1f_1$, and $f_2$ from the second filtered signal; or a combination thereof.

Embodiment 14. The system of any of Embodiments 11 to 13, wherein $C_1f_1$ comprises a harmonic frequency of $f_1$ or a sub-harmonic frequency of $f_1$; or wherein $C_2f_2$ comprises a harmonic frequency of $f_2$ or a sub-harmonic frequency of $f_2$; or a combination thereof.

Embodiment 15. The system of any of Embodiments 11 to 14, a) wherein the first filtered signal comprises a plurality of harmonic frequencies of $f_1$, a plurality of sub-harmonic frequencies of $f_1$, or a combination thereof; or b) wherein the first filtered signal comprises a plurality of harmonic frequencies of $f_2$, a plurality of sub-harmonic frequencies of $f_2$, or a combination thereof; or a combination of a) and b).

Additional Embodiment A. The method or system of any of the above embodiments, wherein the multi-phase flow comprises a liquid phase and at least one of gas bubbles, solid particles, and an immiscible second liquid phase.

Additional Embodiment B. The system of any of Embodiments 11 to 15, wherein cross-correlation of the first filtered signal and the second filtered signal comprises: dividing the first filtered signal into a first plurality of time windows and dividing the second filtered signal into a second plurality of time windows; and cross-correlating one or more time windows from the first plurality of time windows with one or more corresponding time windows from the second plurality of time windows to generate a series of estimated flow velocities.

Additional Embodiment C. The system of Additional Embodiment B, wherein at least one time window from the first plurality of time windows overlaps in time with at least a second time window from the first plurality of time windows, or wherein dividing locations in the second plurality of time windows are offset from dividing locations in the first plurality of time windows; or a combination thereof.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for estimating a flow velocity, comprising:
   selecting a predetermined characteristic of bubbles;
   injecting a first stream comprising the bubbles having the predetermined characteristic into a second stream comprising a multi-phase flow through a pipe;
   generating, by a first transducer, a first ultrasonic signal having a frequency $f_1$ suitable for excitation of at least a portion of the injected bubbles, the first transducer being located on an exterior of the pipe;

receiving, by a first receiver, a first received signal comprising a portion of emitted signal from the injected bubbles having a frequency $C_1f_1$ where $C_1$ does not equal 1, the first receiver being located on the exterior of the pipe, wherein the frequency $C_1f_1$ is at least partially dependent on the predetermined characteristic of the bubbles, the frequency $C_1f_1$ being a predetermined frequency response based on the frequency $f_1$ of the first ultrasonic signal applied to the bubbles;

passing the first received signal through a first filter to form a first filtered signal, the first filter being configured for exclusion of at least a signal having a frequency $f_1$ from the first filtered signal and configured for inclusion of at least a signal having a frequency $C_1f_1$ in the first filtered signal;

generating, by a second transducer, a second ultrasonic signal having a frequency $f_2$ suitable for excitation of at least a portion of the injected bubbles, the second transducer being located on an exterior of the pipe, the first transducer and the second transducer being separated by a separation distance;

receiving, by a second receiver mounted on the exterior of the pipe, a second received signal comprising a portion of emitted signal from the bubbles having a frequency $C_2f_2$ where $C_2$ does not equal 1;

passing the second received signal through a second filter to form a second filtered signal, the second filter being configured for exclusion of at least a signal having a frequency $f_2$ from the second filtered signal and configured for inclusion of at least a signal having a frequency $C_2f_2$ in the second filtered signal;

cross-correlating the first filtered signal with the second filtered signal to determine a time shift corresponding to a maximum correlation between the first filtered signal and the second filtered signal; and estimating the flow velocity of the multi-phase flow based on the separation distance and the determined time shift by dividing the separation distance by the time shift.

2. The method of claim 1, wherein the first filter is configured for exclusion of at least signals having a frequency $f_2$, $C_2f_2$, and $f_1$ from the first filtered signal; or wherein the second filter is configured for exclusion of at least signals having a frequency $f_1$, $C_1f_1$, and $f_2$ from the second filtered signal; or a combination thereof.

3. The method of claim 1, wherein $C_1f_1$ comprises a harmonic frequency of $f_1$ or a sub-harmonic frequency of $f_1$; or wherein $C_2f_2$ comprises a harmonic frequency of $f_2$ or a sub-harmonic frequency of $f_2$; or a combination thereof.

4. The method of claim 1, a) wherein the first filtered signal comprises a plurality of harmonic frequencies of $f_1$, a plurality of sub-harmonic frequencies of $f_1$, or a combination thereof;
b) wherein the first filtered signal comprises a plurality of harmonic frequencies of $f_2$, a plurality of sub-harmonic frequencies of $f_2$, or a combination thereof; or c) a combination of a) and b).

5. The method of claim 1, wherein the multi-phase flow comprises a liquid phase and at least one of gas bubbles, solid particles, and an immiscible second liquid phase.

6. The method of claim 1, wherein $f_1$ comprises a frequency between 100 kHz and 10 MHz, or wherein $f_2$ comprises a frequency between 100 kHz and 10 MHz, or a combination thereof.

7. The method of claim 1, wherein a magnitude of $f_1-f_2$ is 0.01% to 50% of a magnitude of $f_1$.

8. The method of claim 1, wherein $f_1$ is the same as $f_2$.

9. The method of claim 1, wherein cross-correlation of the first filtered signal and the second filtered signal comprises:
dividing the first filtered signal into a first plurality of time windows and dividing the second filtered signal into a second plurality of time windows; and
cross-correlating one or more time windows from the first plurality of time windows with one or more corresponding time windows from the second plurality of time windows to generate a series of estimated flow velocities.

10. The method of claim 9, wherein at least one time window from the first plurality of time windows overlaps in time with at least a second time window from the first plurality of time windows.

11. The method of claim 9, wherein dividing locations in the second plurality of time windows are offset from dividing locations in the first plurality of time windows.

12. The method of claim 1, wherein the predetermined characteristic is selected from the group consisting of a bubble diameter, a bubble composition, and a combination thereof.

13. The method of claim 12, wherein the predetermined characteristic is a bubble diameter.

14. The method of claim 13, wherein the bubble diameter is selected such that the bubbles approximate the velocity of the multi-phase flow.

15. The method of claim 1, wherein the first filter is a band-pass filter, a notch filter, or a lock-in filter.

16. A method for estimating a flow velocity, comprising:
selecting a predetermined characteristic of bubbles;
injecting a first stream comprising the bubbles having the predetermined characteristic into a second stream comprising a multi-phase flow through a pipe;
generating, by a first transducer, a first ultrasonic signal having a frequency $f_1$ suitable for excitation of at least a portion of the injected bubbles, the first transducer being located on an exterior of the pipe;
receiving, by a first receiver, a first received signal comprising a portion of emitted signal from the injected bubbles having a frequency $C_1f_1$ where $C_1$ does not equal 1, the first receiver being located on the exterior of the pipe, wherein the frequency $C_1f_1$ is at least partially dependent on the predetermined characteristic of the bubbles, the first received signal being indicative of the presence of the bubbles;
passing the first received signal through a first filter to form a first filtered signal, the first filter being configured for exclusion of at least a signal having a frequency $f_1$ from the first filtered signal and configured for inclusion of at least a signal having a frequency $C_1f_1$ in the first filtered signal;
generating, by a second transducer, a second ultrasonic signal having a frequency $f_2$ suitable for excitation of at least a portion of the injected bubbles, the second transducer being located on an exterior of the pipe, the first transducer and the second transducer being separated by a separation distance;
receiving, by a second receiver mounted on the exterior of the pipe, a second received signal comprising a portion of emitted signal from the bubbles having a frequency $C_2f_2$ where $C_2$ does not equal 1;
passing the second received signal through a second filter to form a second filtered signal, the second filter being configured for exclusion of at least a signal having a frequency $f_2$ from the second filtered signal and configured for inclusion of at least a signal having a frequency $C_2f_2$ in the second filtered signal;

cross-correlating the first filtered signal with the second filtered signal to determine a time shift corresponding to a maximum correlation between the first filtered signal and the second filtered signal; and estimating the flow velocity of the multi-phase flow based on the separation distance and the determined time shift by dividing the separation distance by the time shift.

17. The method of claim 16, wherein the multi-phase flow comprises contrast agents having a characteristic different from the predetermined characteristic of the bubbles.

18. The method of claim 17, wherein the contrast agents emit a signal having a frequency different from the frequency $C_1f_1$.

19. A method for estimating a flow velocity, comprising:

selecting a predetermined characteristic of bubbles that gives rise to a unique detectable signal distinguishable from those created by other agents dispersed within the multi-phase flow in the pipe;

injecting a first stream comprising the bubbles having the predetermined characteristic into a second stream comprising a multi-phase flow through a pipe;

generating, by a first transducer, a first ultrasonic signal having a frequency $f_1$ suitable for excitation of at least a portion of the injected bubbles, the first transducer being located on an exterior of the pipe;

receiving, by a first receiver, a first received signal comprising a portion of emitted signal from the injected bubbles having a frequency $C_1f_1$ where $C_1$ does not equal 1, the first receiver being located on the exterior of the pipe, wherein the frequency $C_1f_1$ is at least partially dependent on the predetermined characteristic of the bubbles;

passing the first received signal through a first filter to form a first filtered signal, the first filter being configured for exclusion of at least a signal having a frequency $f_1$ from the first filtered signal and configured for inclusion of at least a signal having a frequency $C_1f_1$ in the first filtered signal;

generating, by a second transducer, a second ultrasonic signal having a frequency $f_2$ suitable for excitation of at least a portion of the injected bubbles, the second transducer being located on an exterior of the pipe, the first transducer and the second transducer being separated by a separation distance;

receiving, by a second receiver mounted on the exterior of the pipe, a second received signal comprising a portion of emitted signal from the bubbles having a frequency $C_2f_2$ where $C_2$ does not equal 1;

passing the second received signal through a second filter to form a second filtered signal, the second filter being configured for exclusion of at least a signal having a frequency $f_2$ from the second filtered signal and configured for inclusion of at least a signal having a frequency $C_2f_2$ in the second filtered signal;

cross-correlating the first filtered signal with the second filtered signal to determine a time shift corresponding to a maximum correlation between the first filtered signal and the second filtered signal; and estimating the flow velocity of the multi-phase flow based on the separation distance and the determined time shift by dividing the separation distance by the time shift.

20. The method of claim 19, wherein the injecting the bubbles comprises injecting an amount of bubbles for a predetermined duration of time.

* * * * *